United States Patent
Patil et al.

(10) Patent No.: US 11,275,900 B2
(45) Date of Patent: Mar. 15, 2022

(54) SYSTEMS AND METHODS FOR AUTOMATICALLY ASSIGNING ONE OR MORE LABELS TO DISCUSSION TOPICS SHOWN IN ONLINE FORUMS ON THE DARK WEB

(71) Applicants: Revanth Patil, Tempe, AZ (US); Paulo Shakarian, Tempe, AZ (US); Ashkan Aleali, Tempe, AZ (US); Ericsson Marin, Tempe, AZ (US)

(72) Inventors: Revanth Patil, Tempe, AZ (US); Paulo Shakarian, Tempe, AZ (US); Ashkan Aleali, Tempe, AZ (US); Ericsson Marin, Tempe, AZ (US)

(73) Assignee: Arizona Board of Regents on Behalf of Arizona State University, Tempe, AZ (US)

( * ) Notice: Subject to any disclaimer, the term of this patent is extended or adjusted under 35 U.S.C. 154(b) by 151 days.

(21) Appl. No.: 16/405,612

(22) Filed: May 7, 2019

(65) Prior Publication Data
US 2019/0347327 A1 Nov. 14, 2019

Related U.S. Application Data

(60) Provisional application No. 62/668,878, filed on May 9, 2018.

(51) Int. Cl.
| | |
|---|---|
| *G06F 40/30* | (2020.01) |
| *G06N 20/00* | (2019.01) |
| *G06F 16/951* | (2019.01) |
| *G06F 40/221* | (2020.01) |
| *G06F 40/284* | (2020.01) |

(52) U.S. Cl.
CPC ............ *G06F 40/30* (2020.01); *G06F 16/951* (2019.01); *G06F 40/221* (2020.01); *G06F 40/284* (2020.01); *G06N 20/00* (2019.01)

(58) Field of Classification Search
CPC ...... G06F 40/30; G06F 40/221; G06F 40/284; G06F 16/951; G06N 20/00; G06N 20/10; G06N 20/20; G06N 5/003; G06N 3/084
See application file for complete search history.

(56) References Cited

U.S. PATENT DOCUMENTS

| | | | |
|---|---|---|---|
| 8,972,376 B1 * | 3/2015 | Gailis | G06F 16/951 707/710 |
| 10,176,438 B2 | 1/2019 | Shakarian et al. | |
| 10,313,385 B2 | 6/2019 | Shakarian et al. | |
| 10,437,945 B2 | 10/2019 | Shakarian et al. | |
| 2002/0078045 A1 * | 6/2002 | Dutta | G06F 16/951 |
| 2004/0064464 A1 * | 4/2004 | Forman | G06F 16/35 |

(Continued)

FOREIGN PATENT DOCUMENTS

| | | |
|---|---|---|
| WO | 2019089389 A1 | 5/2019 |
| WO | 2019157335 A1 | 8/2019 |

OTHER PUBLICATIONS

Dumais et al., "Hierarchical Classification of Web Content", ACM 2000. (Year: 2000).*

(Continued)

*Primary Examiner* — Anne L Thomas-Homescu
(74) *Attorney, Agent, or Firm* — Polsinelli PC

(57) ABSTRACT

Embodiments of a computer-implemented system for improving classification of data associated with the deep web or dark net are disclosed.

14 Claims, 11 Drawing Sheets

(56) References Cited

U.S. PATENT DOCUMENTS

| | | | | |
|---|---|---|---|---|
| 2006/0206476 | A1* | 9/2006 | Kapur | G06F 16/30 |
| 2007/0250501 | A1* | 10/2007 | Grubb | G06F 16/3343 |
| 2008/0159495 | A1* | 7/2008 | Dahan | G10L 25/51 |
| | | | | 379/93.01 |
| 2008/0162385 | A1* | 7/2008 | Madani | G06F 16/353 |
| | | | | 706/12 |
| 2008/0189316 | A1* | 8/2008 | Otsuka | G06F 16/3335 |
| 2009/0307196 | A1* | 12/2009 | Shuster | H04L 67/22 |
| 2010/0281022 | A1* | 11/2010 | Gollapudi | G06F 16/9024 |
| | | | | 707/723 |
| 2011/0258560 | A1* | 10/2011 | Mercuri | G06F 16/958 |
| | | | | 715/753 |
| 2013/0097103 | A1* | 4/2013 | Chari | G06N 20/00 |
| | | | | 706/12 |
| 2013/0117451 | A1* | 5/2013 | Du | H04L 63/102 |
| | | | | 709/225 |
| 2013/0132311 | A1* | 5/2013 | Liu | G06K 9/6256 |
| | | | | 706/12 |
| 2014/0250032 | A1* | 9/2014 | Huang | G06N 20/00 |
| | | | | 706/12 |
| 2015/0026159 | A1* | 1/2015 | Berkman | G06F 16/9535 |
| | | | | 707/722 |
| 2017/0032276 | A1* | 2/2017 | Sukhanov | G06F 16/41 |
| 2017/0046180 | A1* | 2/2017 | Desineni | G06F 9/542 |
| 2017/0193060 | A1* | 7/2017 | Khanzode | G06F 16/338 |
| 2018/0025059 | A1* | 1/2018 | Batchu | G06F 16/24564 |
| | | | | 707/740 |
| 2018/0082211 | A1* | 3/2018 | Allen | G06F 16/9535 |
| 2018/0121539 | A1* | 5/2018 | Ciulla | G06F 16/3344 |
| 2018/0246983 | A1* | 8/2018 | Rathod | G06F 16/9535 |
| 2018/0329935 | A1* | 11/2018 | Mugali | G06F 16/282 |
| 2019/0133533 | A1* | 5/2019 | Alam | A61B 5/7221 |
| 2019/0180246 | A1* | 6/2019 | Ferguson | G06F 40/20 |
| 2019/0205885 | A1* | 7/2019 | Lim | G06Q 20/045 |
| 2019/0230070 | A1* | 7/2019 | Isaacson | G07G 1/0036 |
| 2019/0236412 | A1* | 8/2019 | Zhao | G06K 9/6256 |
| 2019/0347359 | A1* | 11/2019 | Guy | G06F 16/9574 |
| 2019/0349393 | A1 | 11/2019 | Nunes et al. | |
| 2019/0362069 | A1* | 11/2019 | Park | G06F 16/904 |
| 2020/0012673 | A1* | 1/2020 | Rudzicz | G06K 9/6264 |
| 2020/0036743 | A1 | 1/2020 | Almukaynizi et al. | |
| 2020/0151222 | A1* | 5/2020 | Mannar | G06K 9/4628 |
| 2020/0159225 | A1* | 5/2020 | Zeng | G05D 1/0088 |
| 2020/0180148 | A1* | 6/2020 | S Nanal | G06F 11/0793 |

OTHER PUBLICATIONS

Dalin et al., "Criminal motivation on the dark web: A categorisation model for law enforcement", Digital Investigation, 2018. (Year: 2018).*

Hassan et al., "A Task Level Metric for Measuring Web Search Satisfaction and its Application on Improving Relevance Estimation", ACM, 2011. (Year: 2011).*

Chawla, "SMOTE: Synthetic Minority Over-sampling Technique", Journal of Artificial Intelligence Research, 2002. (Year: 2002).*

L'Huillier, "Topic-Based Social Network Analysis for Virtual Communities of Interests in the Dark Web", SIGKDD Explorations, 2010. (Year: 2010).*

U.S. Appl. No. 16/424,929, Shakarian et al., filed Nov. 28, 2016.
U.S. Appl. No. 16/548,329, Tavabi et al., filed Aug. 22, 2019.
U.S. Appl. No. 16/640,878, Shakarian et al., filed Oct. 26, 2018.
U.S. Appl. No. 16/653,899, Sarkar et al., filed Oct. 15, 2019.
U.S. Appl. No. 16/875,540, Nunes et al., filed May 15, 2020.
Tor Project, "Tor: Overview" [Online] Available: https://www.torproject.org/about/overview.html.en , accessed Dec. 27, 2018 ("2017").
Abbasi, et al., "Descriptive analytics: Examining expert hackers in web forums", Intelligence and Security Informatics Conference (JISIC), 2014 IEEE Joint, pp. 56-63 (IEEE, 2014).
Breiman, et al., "Random forests-classification description", Department of Statistics, Berkeley 2 (2007).
Chawla, et al., "Smote: synthetic minority over-sampling technique", Journal of artificial intelligence research 16, 321-357 (2002).
Chertoff, et al., "The impact of the dark web on internet governance and cyber security", (2015).
Dekel, et al., "Multiclass-multilabel classification with more classes than examples", Proceedings of the Thirteenth International Conference on Artificial Intelligence and Statistics, pp. 137-144 (2010).
Harris, "Distributional structure", Word 10, 2-3, 146-162 (1954).
Le, et al., "Distributed representations of sentences and documents", Proceedings of the 31st International Conference on Machine Learning (ICML-14), pp. 1188-1196 (2014).
Manning, "Introduction", in Retrieving the Radical Tillich, pp. 1-19 (Springer, 2015).
Marin, et al., "Product offerings in malicious hacker markets", Intelligence and Security Informatics (ISI), 2016 IEEE Conference, pp. 187-189 (IEEE, 2016).
Moore, et al., "Cryptopolitik and the darknet", Survival 58, 1, 7-38 (2016).
Nunes, et al., "Darknet and deepnet mining for proactive cybersecurity threat intelligence", Intelligence and Security Informatics (ISI), 2016 IEEE Conference, pp. 7-12 (IEEE, 2016).
Okapi-BM25, "Okapi-bm25 ranking function Wikipedia, the free encyclopedia", URL https://en.wikipedia.org/wiki/Okapi-BM25, [Online; accessed Dec. 12, 2017] (2017).
Pedregosa, et al., "Scikit-learn: Machine learning in Python", Journal of Machine Learning Research 12, 2825-2830 (2011).
Pérez-Iglesias, et al., "Integrating the probabilistic models bm25/bm25f into lucene", arXiv preprint arXiv:0911.5046 (2009).
Rajaraman, Jd (2011). Data mining, Mining of Massive Datasets pp. 1-17 (2011).
Rong, "word2vec parameter learning explained", arXiv preprint arXiv:1411.2738 (2014).
Samtani, et al., "Azsecure hacker assets portal: Cyber threat intelligence and malware analysis", Intelligence and Security Informatics (ISI), 2016 IEEE Conference, pp. 19-24 (IEEE, 2016).
Sanderson, Introduction to information retrieval, Cambridge university press 2009, Natural Language Engineering 16, 1, 232-234 (2010).
Sparck Jones, "A statistical interpretation of term specificity and its application in retrieval", Journal of documentation 28, 1, 11-21 (1972).
Wikipedia, "Random forest—wikipedia, the free encyclopedia", URL https://en.wikipedia.org/w/index.php?title=Randomforestoldid=822509370, [Online; accessed-Dec. 29, 2018].

* cited by examiner

FIG. 7
FIG. 8
FIG. 9
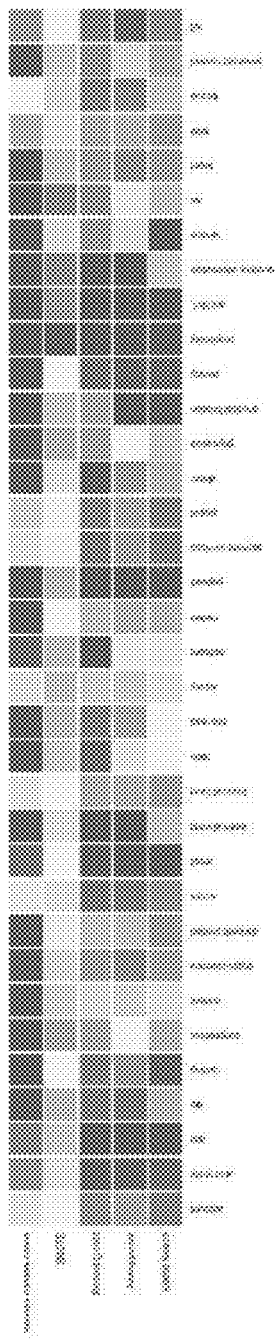
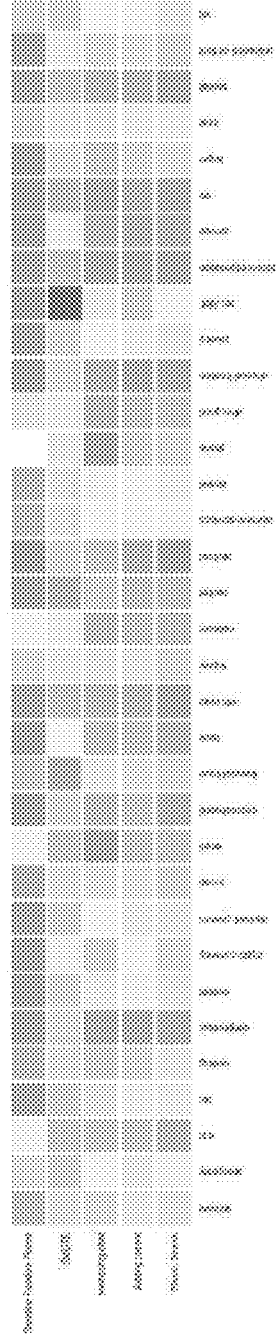
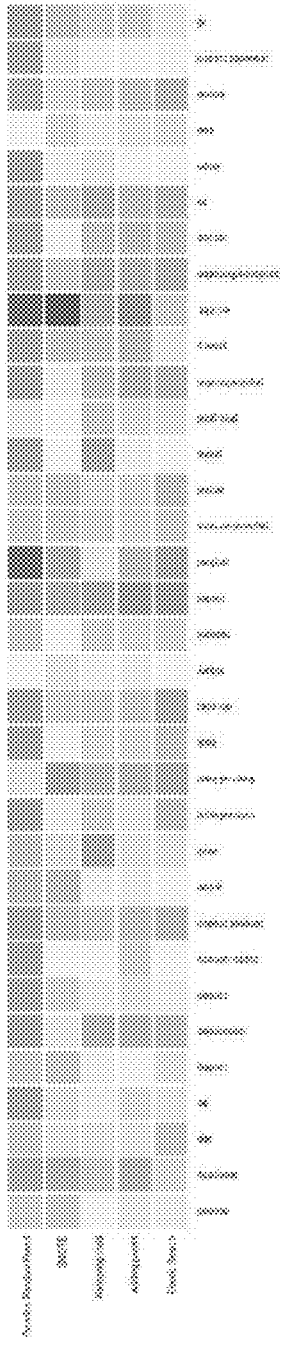

SYSTEMS AND METHODS FOR AUTOMATICALLY ASSIGNING ONE OR MORE LABELS TO DISCUSSION TOPICS SHOWN IN ONLINE FORUMS ON THE DARK WEB

CROSS REFERENCE TO RELATED APPLICATIONS

This is a U.S. non-provisional patent application that claims benefit to U.S. provisional patent application Ser. No. 62/668,878 filed on May 9, 2018, which is incorporated by reference in its entirety.

FIELD

The present disclosure generally relates to systems and methods for automatically assigning one or more labels or tags related to various discussion forum topics on the dark web or deep web.

BACKGROUND

The ability to traverse the Internet with complete anonymity provides online platforms for illegal activities such as credit card fraud, identity theft, leaks of sensitive information and sharing hacking information. One of the most prevalent cyber environments that emerged in the last decade and contributed to the achievement of those criminal tasks are dark web forums, since these forums include encryption technology to prevent monitoring and also provide protection from unauthorized users. Table 1 provides the details of thirteen broad categories of data seen in web based hidden services on the dark web, having discussion forums as the main supplier platform for the spread of criminal activities. For example, the deep web data can be classified into different domains such as hacking, whistleblowing, financial-fraud, drugs, counterfeit, books, pornographic materials, etc.

TABLE 1

| Web Based Hidden Services in February 2016 | |
|---|---|
| Category | Percentage |
| Violence | 0.3 |
| Arms | 0.8 |
| Social | 1.2 |
| Hacking | 1.8 |
| Illegitimate pornography | 2.3 |
| Nexus | 2.3 |
| Extremism | 2.7 |
| Unknown | 3.0 |
| Other illicit | 3.8 |
| Finance | 6.3 |
| Drugs | 8.1 |
| Other | 19.6 |
| None | 47.7 |

Considering the enormity of the data in those environments, there is an impending need to go beyond this broad categorization, thereby providing to security researchers a more granular, structural and interdependent classification of the available information.

The dark web forms a small part of the deep web that is not indexed by web search engines. Dark web websites provide underground communication and are accessible by special software like Tor (The Onion Router) and I2p Invisible Internet Project. Tor software uses "onion routing" protocol to provide anonymity for both the service user and the service provider. Onion routing is a technique where messages are repeatedly encrypted and then sent through several network nodes, called onion routers. Like someone peeling an onion, each onion router removes a layer of encryption to uncover routing instructions, and sends the message to the next router where the process is repeated. This technique prevents intermediary nodes from knowing the origin, destination, and contents of the message.

Current technologies use learning models and techniques that do not address the issues of labeled data scarcity, nor do they address imbalanced data classes in the training set. Training sets are labeled by hand, which is a time-consuming and typically un-scalable process. A more thorough and versatile learning method is desired.

It is with these observations in mind, among others, that various aspects of the present disclosure were conceived and developed.

BRIEF DESCRIPTION OF THE DRAWINGS

FIG. 7 is a graphical representation of a tag-wise precision scores for each experiment, according to aspects of the present disclosure;

FIG. 8 is a graphical representation of a tag-wise recall scores for each experiment, according to aspects of the present disclosure;

FIG. 9 is a graphical representation of a tag-wise F1 scores for each experiment, according to aspects of the present disclosure;

Corresponding reference characters indicate corresponding elements among the view of the drawings. The headings used in the figures do not limit the scope of the claims.

DETAILED DESCRIPTION

Figure 1:
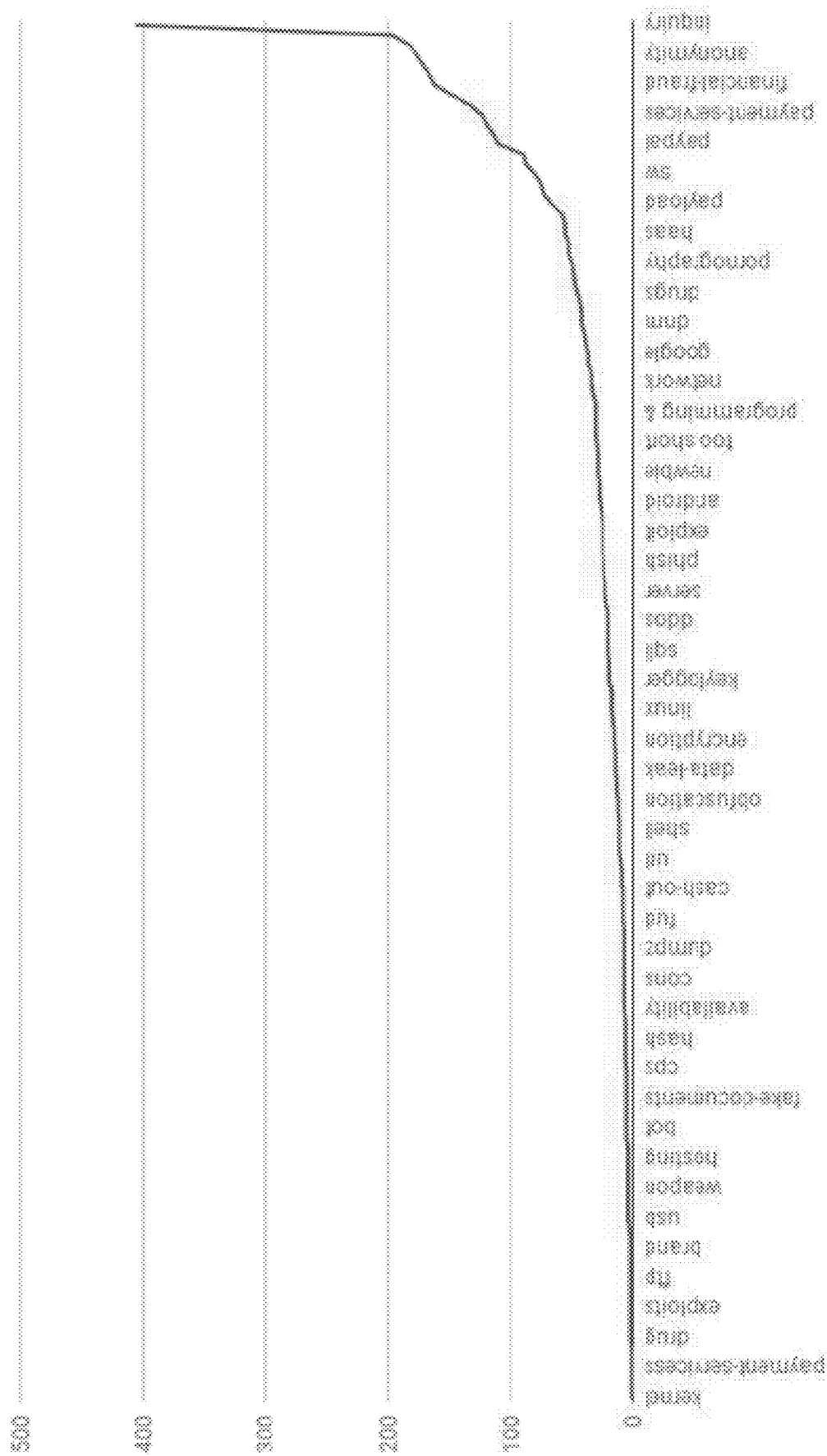
FIG. 1 is a graphical representation showing frequency tags in a training set, according to aspects of the present disclosure.

The present disclosure is related to dark web-deep web (d2web) forums that are anonymously hosted and are identified by the domain '.onion'. Forums are online discussion sites where like-minded individuals can hold conversations. These anonymous hosting forums discuss various cyber-security related topics such as worms, botnet, zero-days, hacking tools, backdoor services and etc.

Aspects of the present disclosure include an inventive computer-implemented system (hereinafter "system" or "present system") that involves automatically assigning one or more labels (tags), in a hierarchical structure, to discussion topics seen in d2web forums. In some embodiments, the present system is formed by four main modules. In one method, the present system crawls various d2web sites and extracts important information from html pages, storing it in a database. Specialized crawlers automatically connect and authenticate the d2web sites through Tor. The important information is then parsed from these sites, such as discussion topics, user related information, discussion posts, etc., and the information stored on a database as well as on an elastic search data store. Data preprocessing and feature extraction is then performed over the forum discussion topics. This may be accomplished by eliminating all non-English words and irrelevant characters, conducting tokenization and stop word removal, stemming, and lemmatization. The present system then extracts features from every topic on the forum using Doc2vec. Finally, in the fourth module, different machine classifiers are used to assign multiple tags to each topic, so that their performances can be compared. A further description of the present system for automatically assigning one or more labels to d2web discussion topics is described in greater detail below.

Problem Statement

Classification of d2web forum discussions is a multiclass, multi-label classification problem, where the goal is to automatically assign one or more labels to each discussion topics. Formally, let X be a set of forum topics, $y=\{0, 1\}^k$, let k be possible tags and D be an unknown distribution on the product space X×Y. Each element (x,y) in this space is composed of an instance x and a label vector y, which is a vector of indicators $y=[y_1, \ldots, y_k]$ that specifies classes associated with x. A classifier is a function h: X→Y, that maps instance x to a label vector y=h(x). For example, the sample forum topic "warning enigma badlock—upcoming smb/cifs and samba vulnerability" belongs to three classes—"vuln", "smb" and "file-share".

The present system leverages data crawled from a dataset of 283 cyber security related online forums. From the collected html pages or documents of the dataset, the present system parses predetermined important fields from the data such as topic title, posts, user name, title posted date, user ratings, number of replies, etc. The dataset includes discussions related to 486,996 different topics with 4,188,345 posts and 748,698 users participating in those topics.

The ground truth to build a machine learning model may be hand labeled by field experts. The present system has 2,046 labeled topics as a training set and they belong to 226 unique tags. FIG. 1 shows the tag frequency in the training set. Some tags have more than 400 topics in the training set while some have just one topic. Table 2 provides the sample ground truth topics and the tags associated.

Feature Extraction

Textual feature extraction was performed on topic title using a Doc2vec vectorization technique. Doc2vec is an extension of Word2vec that relies on the idea that words which appear in the similar context have the same semantic meaning. Word2vec is computationally-efficient predictive model that uses shallow two layer neural network for learning word embeddings. A Distributed Memory Model of Paragraph Vectors (PV-DM) Doc2vec architecture was used which is based on Continuous Bag Of Words (CBOW) Word2vec architecture. PV-DM architecture is faster to train and has better accuracy for frequent words.

TABLE 2

Sample Ground Truth

| Topic titles | Tags |
|---|---|
| enigma badlock - upcoming smb cifs and samba vulnerability. | vuln, smb, file-share |
| u nessus vulnerability scan warning enigma badlock - upcoming smb/cifs and samba vulnerability. | vuln, pentest, network vuln, smb, file-share |
| question about school-sponsored wifi? | wifi, inquiry |
| technical question about wifi cards | wifi, inquiry |
| (b) paypal unchecked accounts (s) btc account | financial-fraud, darkweb product, paypal, payment-services, market |
| there are phishing attempts reported! | phishing |
| [u'[payload] sharing some payloads!'] | malware, payload, hack |

Word2vec CBOW.

Figure 2:
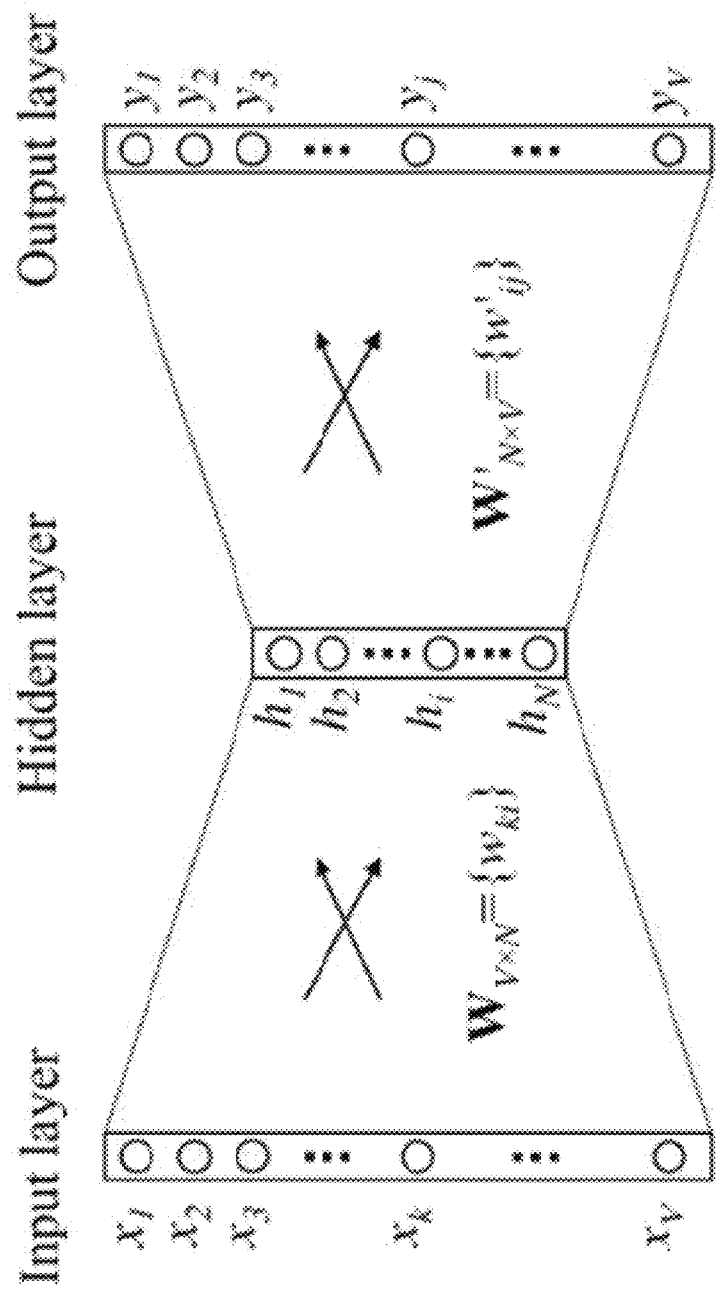
FIG. 2 is a simplified illustration showing a simple Word2vec CBOW Model in the Only One Word in the Context, according to aspects of the present disclosure.
Figure 3:
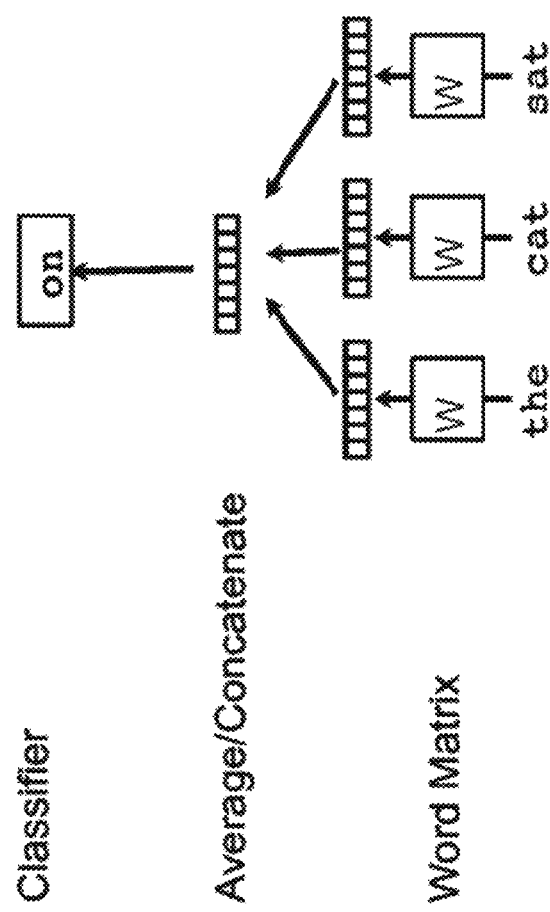
FIG. 3 is a simplified illustration showing a Word2vec CBOW framework for Learning Word Vectors, according to aspects of the present disclosure.

In this architecture, the model implemented by the system predicts the current word from a sliding window of context words. FIG. 2 shows a CBOW architecture with just one word considered per context. Consider the settings with V as vocabulary size and N as hidden layer size. The input is a one-hot encoded vector (i.e. for a given input context word, only one of the V units, {x1, x2, . . . , xv}, is 1). Weights between the input and the hidden layer are represented by W which is of dimensions V×N. The activation function for the hidden layer is linear. Formally, row i of W and for a given context word w, $$h=W^T x := v_w^T \qquad \text{Equation: 1}$$

$v_w$ is the vector representation of the input word w. From the hidden layer to the output layer, there is different weight matrix W' which is of dimension N×V. A score $u_j$ is computed for each word in the vocabulary, $$u_j = v'_{w_j}{}^T h$$

where $v'_{w_j}{}^T$ is the j-th column of the matrix W'. A log-linear softmax function is applied to obtain posterior distribution of words. Formally, $y_j$ is the output of jth unit in the output layer.

$$y_j = \frac{\exp(u_j)}{\sum_{j'=1}^{V} \exp(u_{j'})}$$

The weights (W and W') are updated using a logarithmic loss function with a back propagation method. After updating the weights, $v_w$ is used for word w from Equation 1 as the 'input vector' word embedding.

Doc2vec PV-DM.

Figure 4:
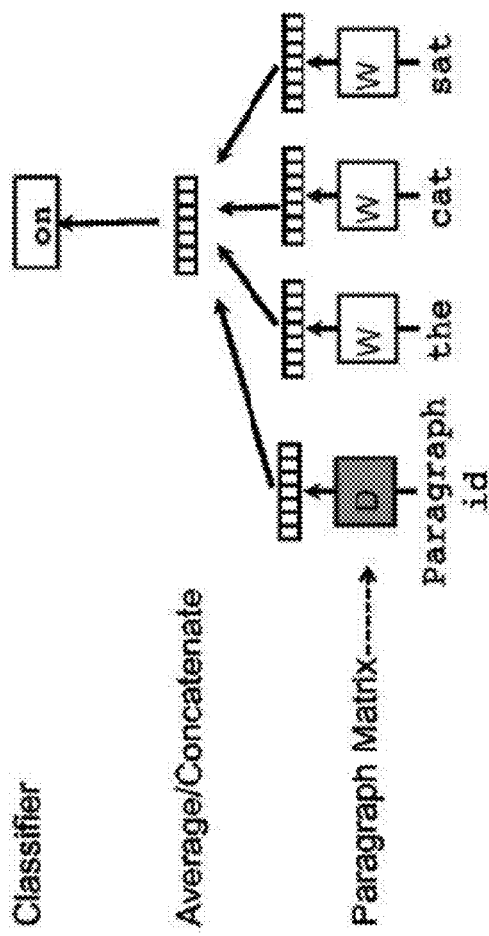
FIG. 4 is a simplified illustration showing a Doc2vec Pv-dm framework for Learning Vectors, according to aspects of the present disclosure.

A paragraph vector is a supervised framework that may be implemented by the system that learns continuous distributed vector representations for documents instead of words. The text in the documents can be of variable length. As shown in FIG. 4, every paragraph is mapped to a unique vector, represented by a column matrix D and every word is also mapped to a unique vector, represented by a column in matrix W. The paragraph vector and word vectors are averaged or concatenated to predict the next word in a context. The only difference between this Doc2vec PV-DM model compared to the Word2vec framework is the addition of a paragraph vector along with the word vectors.

Tags and the Hierarchy Among Tags

Figure 5B:
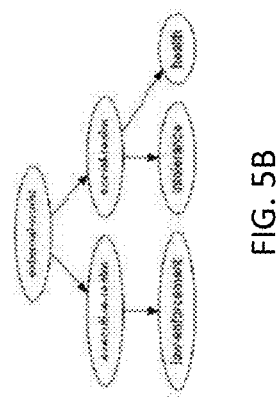
FIGS. 5A-5C are simplified illustrations showing a sample of a tag-hierarchical structure, according to aspects of the present disclosure.
Figure 5A:
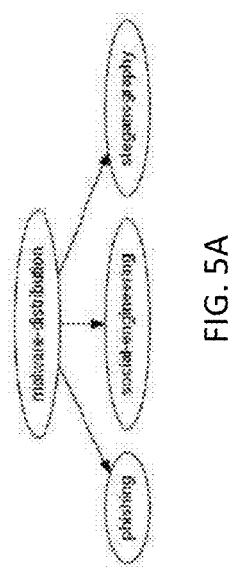
Figure 5C:
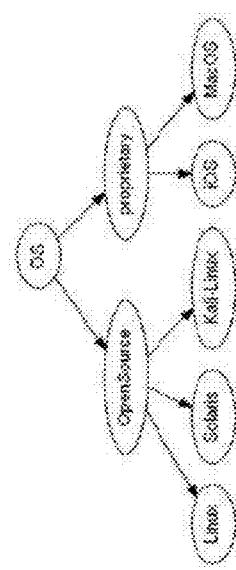

In the ground truth, each topic is associated with multiple tags. It was observed that there is a natural hierarchical structure in the set of tags. There are group tags (parent tags) that can be seen as the "broader term" for its set of specific tags (child tags). Nesting specific tags under group tags creates a hierarchy of tags. FIGS. 5A-5C show an example of the hierarchical structure in the training dataset. In the illustrated case (FIG. 5B), external-world tag is the more generic parent tag for social-realm and health tag. Similarly social-realm and health tags are child tags to external-world tag.

Formally, a hierarchy constraint is given by a set $\mathcal{H} = \{H_1, H_2, \ldots, H_n\}$ where $H_i$ is a tree. For all the tags T, a set of tags S $(S \subseteq T)$ are said to be consistent if every tag t $(t \subset S)$ satisfies either of the two conditions:

1. $p_t = t$ i. e t is a root node
2. $p_t$ is consistent with respect to $\mathcal{H}$ where $p_t$ tag is parent of tag t.

Baseline Approach

For the baseline approach, Support Vector Machine, decision tree, and random forest classifiers are used to perform multi-class and multi-label classification.

A Support Vector Machine (SVM) is a supervised learning method that finds a hyper-plane that may differentiate two classes in a multi-dimensional feature space. In addition to performing linear classification, SVM can efficiently perform a non-linear classification using kernel function, implicitly mapping their inputs into high-dimensional feature spaces. The SVM radial basis function (rbf) kernel is used with "one-vs-the-rest" strategy to perform multi-class multi-label classification.

Decision trees are a non-parametric supervised learning method used for classification and regression. These decision trees learn the simple decision rules from the data features to predict the target label. The decision tree method is a recursive partitioning algorithm that is widely used for classification problems. This algorithm aims to maximize the information gain at every step.

Random Forest classifier is an ensemble algorithm that creates different decision trees by randomly selecting a subset of a training set and a subset of features. The number of features that are searched at each split point is specified as the parameter. To reduce memory consumption, the total number of trees and size of the trees is controlled. Random Forest then aggregates the votes from different decision trees to decide the final class of the test object.

Overview of Problem Specific Challenges

Ensuring Consistency in Results Based on Hierarchy.

In the ground truth, it is observed that the tags had natural hierarchy. As the original ground truth is hand labeled, it cannot expect all of the ground truth entries to respect the tag hierarchy due to human error. Therefore, an automation script was developed that establishes the hierarchy in topic titles in the ground truth. Now, with hierarchy established in the tags, the classifier provided detailed tag prediction for all the documents.

Ideally, the classifier should predict the hierarchical representation of tags, for example, for a predicted child tag every parent tag should also be predicted. However it is observed that for some tags returned by the classifier function, the corresponding parent tags is not returned. This happens when either the tag is wrongly predicted (false positive) or when some of the correct tags (false negatives) are not predicted.

Class Imbalance:

The class imbalance problem typically occurs when, in a classification problem, there are many more instances of some classes than the others. In such cases, classifiers tend to be overwhelmed by the majority classes and ignore the minority classes. These minority classes usually have lesser precision and recall scores in the baseline approach.

Semi-supervised learning techniques are usually used to over-sample and under-sample the minority or majority class for adjusting the class distribution of a dataset.

Leveraging Tag Hierarchy

Three approaches are used (adding parent tag, removing child tag, and a combination of adding parent and removing child tag) to ensure that tag hierarchy is maintained in the prediction list.

Adding Parent Tag.

If a child tag is predicted by the classifier and if the corresponding parent tags in the hierarchy are not predicted, then all the parent tags are added to the prediction list. In FIG. 5B, with the tag hierarchy—"external-world", "social-realm", "health"—if a "health" tag is predicted without "external-world" and "social-realm", then "external-world" and "social-realm" tags are added to the prediction list.

Removing Child Tag.

In this approach, all predicted child tags are removed that do not have all the hierarchical parent tags. In FIG. 5B, with the tag hierarchy—"external-world", "social-realm", "health"—if "external world" and "health" tags are predicted without "social-realm", then the "health" tag is removed from the prediction list, keeping only "external-world".

---

Algorithm 1 Combination of Adding Parent Tags and Removing Child Tags (T)

Input: Prediction list of tags (T) for each document.
Output: Prediction list of tags that respect the tag hierarchy for each document.
1: β ← remove child threshold value
2: α ← add parent threshold value
3: for t:= 1 to T do
4:   p(t) ← prediction probability of tag t.
5:   if p(t) < β then remove all child tags of tag t from prediction list
6: for t:= 1 to T do
7:   p(t) ← prediction probability of tag t.
8:   if p(t) > α then add all parent tags of tag t from prediction list
   return updated prediction list

---

Combination of Adding Parent Tag and Removing Child Tag

In this approach, the present system regulates the way parent tags are added and child tags are removed, based on the probability of the predicted tag. The following threshold values are used—'add parent threshold' (α) and 'remove child threshold' (β)—to decide whether to add parent tag or remove child tag. The procedure for this approach is described in Algorithm 1.

Dealing with Class Imbalance

The discussions in the dark forums are based on various topics which are unequally distributed. Therefore, class imbalance is observed in the ground truth. In the dataset, the ratio of the minority to the majority classes is usually around 1:400, which is quite drastic. To deal with the class imbalance problem, semi-supervised learning methods are utilized. Semi-supervised learning is a class of supervised learning techniques that also make use of additional unlabeled data to better capture the shape of the underlying data distribution and generalize new samples more effectively.

Synthetic Over-Sampling Technique

Synthetic Minority Over-Sampling Technique (SMOTE) is used as a baseline approach to solve the class imbalance problem. Oversampling is to correct for a bias in the original dataset. In SMOTE, the minority class is over-sampled by taking each minority class sample and introducing synthetic examples along the line segments joining all of the k minority class nearest neighbors. Depending upon the amount of over-sampling required, neighbors from the k nearest neighbors are randomly chosen.

For each minority class sample synthetic examples are introduced along the line segments joining any/all of the k minority class nearest neighbors. Depending upon the amount of over-sampling required, neighbors from the k nearest neighbors are randomly chosen. The present system currently uses five nearest neighbors. Synthetic samples are generated in the following way:

1) Take the difference between the feature vector under consideration and its nearest neighbor.
2) Multiply this difference by a random number between zero and one.
3) Add it to the feature vector under consideration.

In this manner, a random point is synthetically introduced along the line segment between two specific features.

Leveraging Document Similarity through Elastic Search

One way to solve the class imbalance problem is by increasing the ground truth size, but that is difficult as a human-labeled data-set is used. Therefore, a semi-supervised method is used to increase the sample size of the minority classes. Semi-supervised learning methods also make use of unlabeled data for training—typically a small amount of labeled data with a large amount of unlabeled data. For every sample in the minority class, we find the top similar documents from the database using the elastic search similarity score and add them to the training data.

Elastic search is a high-performance, full-featured text search engine library. Its ranking function is applied to determine how relevant a retrieved document is to a given query. The ranking function is based on a combination of Vector Space Model and a Boolean model of Information Retrieval. The main idea behind this approach is the more times a query term appears in a document relative to the number of times the term appears in the whole collection, the more relevant that document will be to the query. The elastic search uses BM25 as the default ranking function to provide the relevance score to a given search query. BM25 is not a single function, rather, a family of TF-IDF like retrieval functions. One of the most commonly used scoring functions is described below. Given a query Q, containing keywords q1, ..., qn, the BM25 score of a document D is $$\text{score}(D, Q) = \sum_{i=1}^{n} IDF(q_i) \cdot \frac{f(q_i, D) \cdot (k_1 + 1)}{f(q_i, D + k_1 \cdot \left(1 - b + b \cdot \frac{|D|}{avgdl}\right)}$$

where $f(q_i, D)$ is $q_i$'s term frequency in document D, |D| is the length of the document D in words and avgdl is the average document length in the text collection from which documents are drawn. $k_1$ and b are free parameters, usually chosen, in absence of an advanced optimization, as $k_1 \in [1.2, 2.0]$ and b=0.75. $IDF(q_i)$ is the Inverse document frequency weight of the query term $q_i$. $IDF(q_i)$ is usually computed as:

$$IDF(q_i) = \log \frac{N - n(q_i) + 0.5}{n(q_i) + 0.5}$$

where N is the total number of documents in the collection, and $n(q_i)$ is the number of documents containing $q_i$. The semi-supervised relevance score based is described by algorithm 2.

---
Algorithm 2 Semi-Supervised Learning with Document Similarity (T, Tr ($T_i$, $T_p$), F)

---
Input: Tags in training set T, Training set Tr with tuple (document titles $T_i$, tag predictions $T_p$, Frequency of tags in training set F.
Output: Increased minority class samples from untrained dataset, lms.
1:  $T_{min}$ ← array of minority classes
2:  for t in T do
3:      if F(t) < 150 then
4:          $T_{min}$ ← add tag t
5:  for ti in Ti do
6:      tp ← $T_p$(ti)
7:      if tp in $T_{min}$ then
8:          sd ← use relevance score and find top similar documents from untrained data
9:          lms ← add tuple(sd, tp)
10: lms ← add Tr
    return lms

---

Experiments

Figure 6:
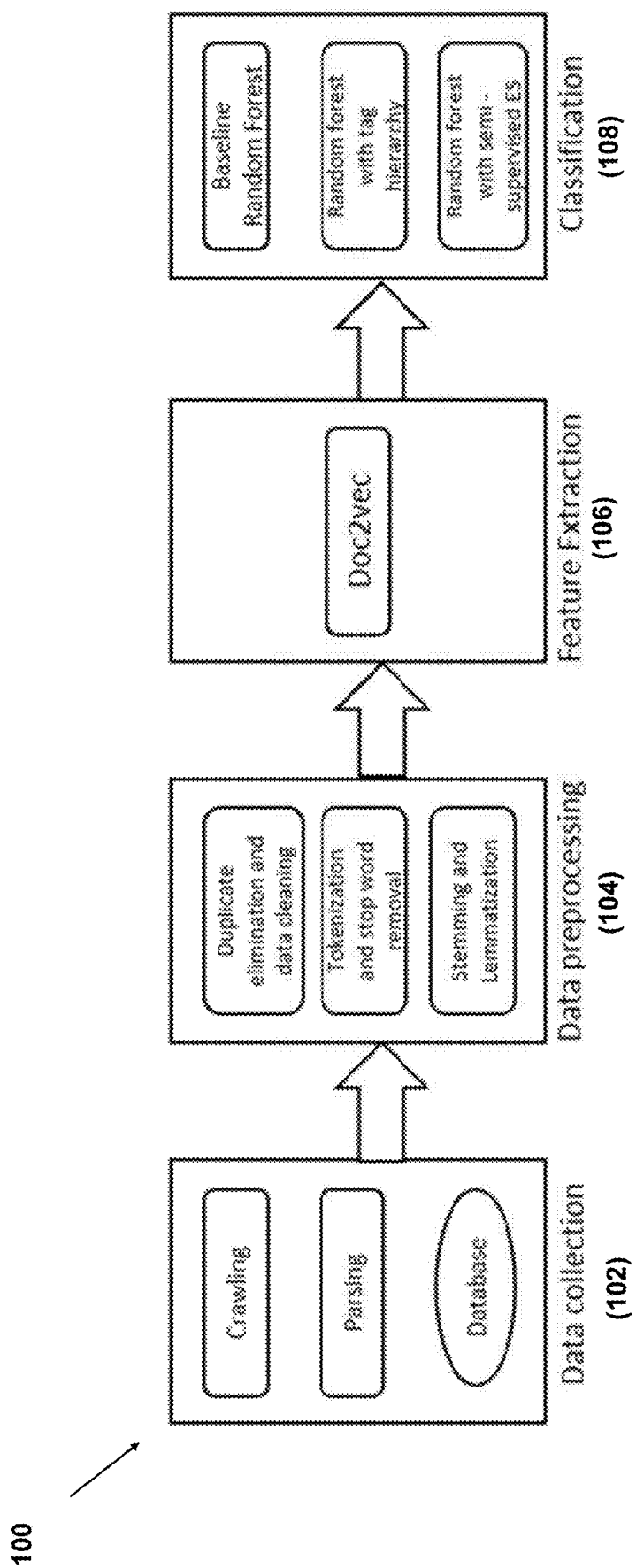
FIG. 6 is a simplified block diagram of a system overview, according to aspects of the present disclosure.

FIG. 6 shows the overview of the present system 100. As shown, the present system 100 consists of four main modules—data collection 102, data-preprocessing 104, feature extraction 106, and classification 108. Spider programs are used to crawl dark web forums and human analysts filter these forums that are relevant to cyber security domain. On these forum sites, Tor-based specialized crawlers are used to traverse the website and retrieve Internet documents and related information, such as HTML pages. Each site has a parser program that extracts important information, such as fields including a topic title, topic content, post content, topic author, post author, author reputation, posted date for each title and posts, etc., from HTML pages, all of which is stored on a database. In some embodiments, expert analysts use a fraction of this data to prepare ground truth by labeling tags to topic titles. In some embodiments, this ground truth may form the basis for the next 3 modules to develop the machine learning model.

In addition, FIG. 6 shows the data preprocessing 104 steps—eliminating duplicates in the ground truth, eliminating non-English content in both the ground truth and the test data, tokenizing the data, removing stop words, and applying stemming and lemmatization processes on the data.

Tokenization.

Given a sequence of characters, tokenization is the task of chopping it up into pieces, called tokens, at the same time throwing away certain characters, such as punctuation and non-asci characters. In the meanwhile, the useful characters are kept, such as currency symbols, question mark etc. that add semantic meaning to the features.

Stop Word Removal.

Extremely common words that appear in most of the documents are of little value in feature extraction. Therefore, these common words are removed from the topic titles.

Stemming and Lemmatization.

Stemming is the process for reducing inflected or derived words to their stem, base or root form. Lemmatization is the process of grouping together the different inflected forms of a word so they can be analyzed as a single item. Lemmatization and stemming are closely related. The small difference is that lemmatization uses the context, whereas stemming operates on a single word. For example, stemming process reduces the derived words—"caresses", "ponies" and "cats" to "caress", "poni", and "cat" respectively. On the other hand, lemmatization reduces the derived word "saw" to "see" or "saw" depending on whether the use of token was a verb or a noun.

Description of Software

Table 3 provides a summary of a software application 150 that may be developed and implemented to perform aspects of the system 100 described herein, and version description for each of the possible modules used in the application 150. In one embodiment, for data-preprocessing, a module textblob with version '0.12.0' was used for part-of-speech tagging and natural language toolkit (nltk) library with version '3.2.4' for tokenization, stemming and lemmatization. For vectorization, scikit-learn and sklearn version '0.19.0' were used for Tf-IDF feature extraction and gensim module version '2.3.0' for doc2vec vectorization. For supervised classification, svm was used, decision tree and random forest classifiers built in sklearn '0.19.0'. For SMOTE technique, an imblearn module version '0.3.0' was used. All the above modules of the application 150 may be developed using python '2.7.13' programming language, but the present disclosure is not limited in this regard. To find similar documents using ES, the elastic search version '5.3.2' with backend lucene search engine version '6.4.2' was used. All the systems were implemented in Linux based Ubuntu 16.04 LTS operating system.

TABLE 3

Figure 13:
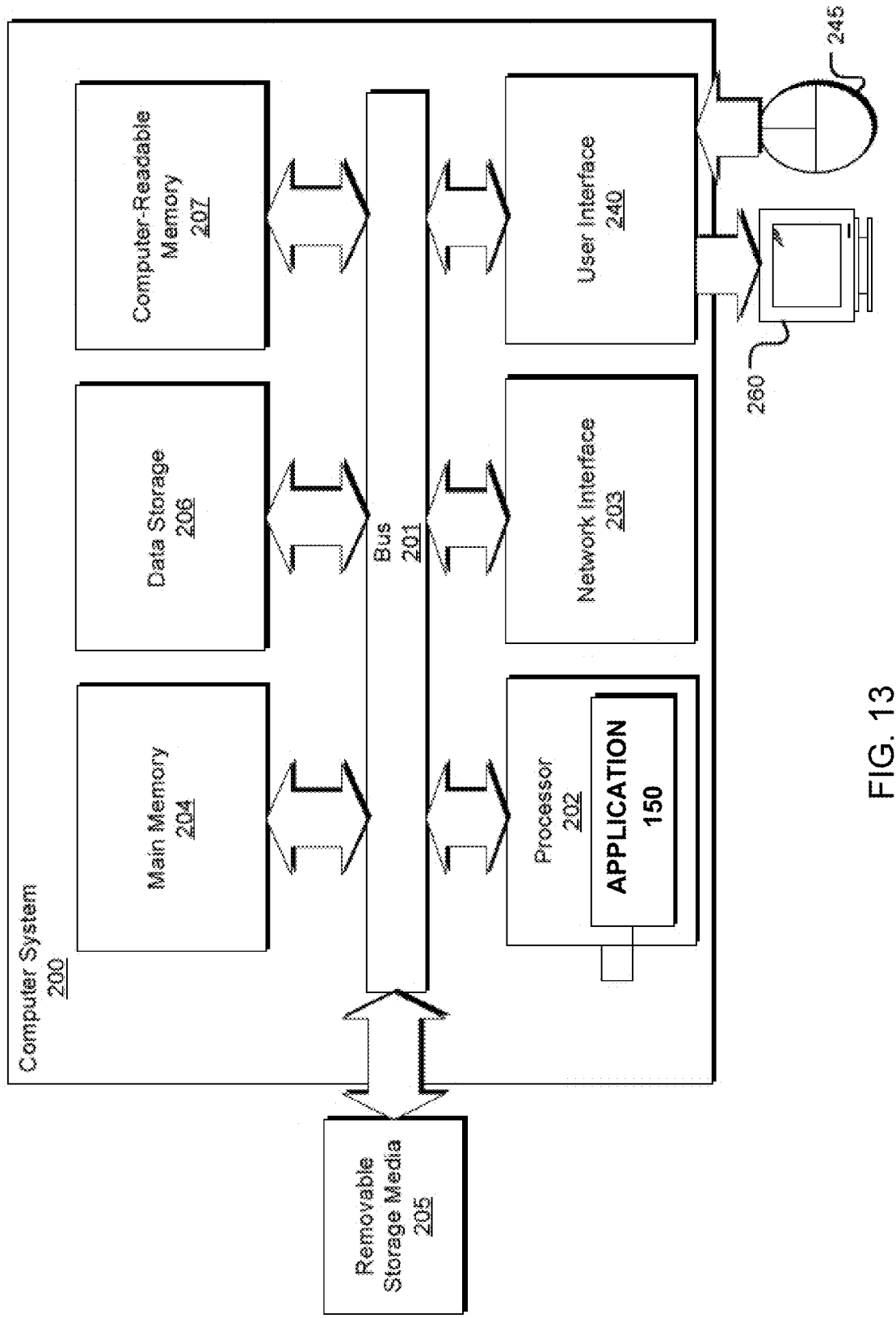
FIG. 13 is a simplified block diagram of an exemplary computer system for effectuating the functions of the framework for security strength and performance analysis, according to aspects of the present disclosure.

Software Description of the Modules (for application 150 shown in FIG. 13).

| Module | Software |
|---|---|
| Data preprocessing | textblob '0.12.0' |
| Tokenization, Stemming and Lemmatization | Natural language toolkit(nltk) '3.2.4' |
| Doc2vec | Gensim '2.3.0' |
| SVM, the decision tree and random forest classifications | scikit-learn '0.19.0' |
| SMOTE | imblearn '0.3.0' |

Description of Metrics

The performance of the classifier models is evaluated based on four metrics—precision, recall, F1 score, and percentage of documents titles with at least one correct prediction tag. Precision, recall and F1 scores are calculated for each of the tags and for all the tags put together. Table 4 lists the formal definitions of precision, recall and F1 scores. Precision score is defined as the fraction of correctly predicted document titles from all the predicted document titles. Recall score is defined as the fraction of correctly predicted document titles from the total number of document titles. F1 measure is the harmonic mean of precision and recall score. The precision, recall, and F1 scores were calculated for individual tags and for the cumulative of all the tags.

TABLE 4

EVALUATION METRICS.

| Metric | Formula |
|---|---|
| Precision | $\frac{TP}{TP+FP}$ |
| Recall | $\frac{TP}{TP+FN}$ |
| F1 | $2 * \frac{precision * recall}{precision + recall}$ |

True Positives (TOP), False Positives (FP), False Negative (FN).

The results of different experiments; baseline classifiers, classifiers with tag hierarchy considered, and classifiers with semi supervised learning technique are described below.

Results of Baseline Classifier

In all the experiments, a training set with topic titles to perform 10-fold cross validation is used to validate the models. With 10-fold cross validation, the ground truth data is randomly partitioned into 10 equal subsample buckets. Out of 10 buckets, one bucket is used for testing the model and the rest of the ground truth is used for training the model. Each of the 10 bucket subsamples are used for testing the model in cross validation. The aggregate of the accuracy scores of k scores is used as the final accuracy score. As the ground truth data contains 2,046 titles, each of the 10 buckets consists of 204 samples for testing and 1,842 for training the model.

TABLE 5

Experimental Results

| Experiment | Precision % | Recall % | F1 score % | Percentage of documents with at least one correct prediction |
|---|---|---|---|---|
| Baseline Decision trees | 58.3 | 6.41 | 11.54 | 24 |
| Baseline SVM | 67.2 | 8.51 | 15.1 | 27.9 |
| Baseline Random Forest | 71.1 | 11.3 | 19.7 | 31.37 |
| Add parent | 71.9 | 20.2 | 31.5 | 46.07 |
| Remove Child | 74 | 11.4 | 19.47 | 43.6 |
| SMOTE | 40.3 | 30.1 | 34.4 | 61.76 |
| Semi-supervised learning based on Elastic Search relevance score | 78.4 | 21.2 | 33.1 | 54.9 |

Decision Tree, SVM, and Random Forest were used to perform multi-class and multi-label classification. For the decision tree classifier, pruning to avoid overfitting was used, by setting the minimum number of samples required at a leaf node to 5%. For SVM kernel, a 'one-vs-the-rest' strategy was used with radial basis function (rbf) kernel. For the random forest, the number of estimators of the tree parameter was tuned and found optimal results when number of estimators is 200. In the above mentioned setting, the Random Forest performed best with the 71.1% precision score and 11.3% recall score. Therefore, Random Forest was used as the default classifier for all the experiments.

Change in Precision and Recall Scores for Each Tag Vs Frequency of Each Tag in Training Set for ES Based Semi-Supervised Technique Three different approaches were used—adding Parent tag, removing child tag, combination of adding parent and removing child tag—to preserve the tag hierarchy in all tag predictions.

Adding Parent Tags

In every iteration of the K-fold cross validation, if a child tag is predicted by the classifier and if the corresponding parent tags in the hierarchy are not predicted, then all the parent tags are added to the prediction list. Adding parent tags decreases false negatives and increases true positives. Hence, the recall score would increase, but if the child tag is wrongly predicted then the error is propagated and increases the false positives, thereby decreasing the precision score. This observation reveals that there is a slight decrease in the precision score, but the recall score improved significantly from 11.3% to 20.2%.

Removing Child Tags

In every iteration of K-fold cross validation, all predicted child tags that did not have all the corresponding hierarchical parent tags are removed. This experiment reduces the false positives, thereby increasing the precision. The observation from this experiment revealed that the precision increased from 71.1% to 74%, and the recall score did not change from the baseline.

Combination of Adding Parent Tags and Removing Child Tags (CAR)

In this approach, the desire was to regulate the way parent tags were added and child tags removed based on the probability of the predicted tag. The "add parent threshold" ($\alpha$) or the "remove child threshold values" ($\beta$) are used in order to decide on whether to add or remove a particular tag, respectively.

Figure 10:
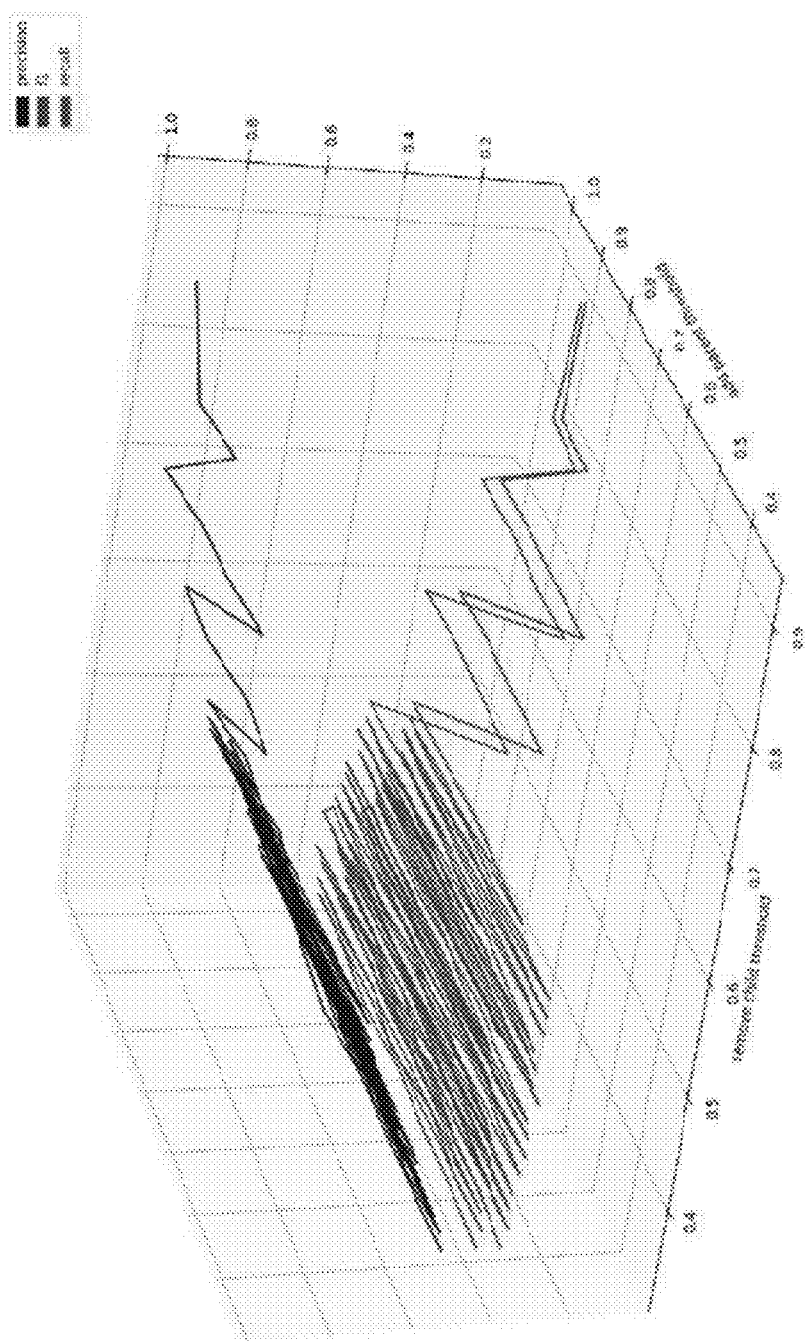
FIG. 10 is a graphical representation of a combination of adding parent tags and removing child tags with threshold, according to aspects of the present disclosure.

Removing child tags reduces false positives, increasing the precision score, while adding parent tags reduces false negatives, increasing the recall score. The above experiment was repeated for different "remove child threshold" ($\beta$) and "add parent threshold" ($\alpha$) values. As shown in FIG. 10, with an increase in "add parent threshold" ($\alpha$) value, the recall score increased and precision score decreased. Conversely, with an increase in "remove child threshold" value ($\beta$), the precision score increased and recall score decreased. The aim was to find an optimum increase in F1 score without drastically affecting the precision score by tuning the ($\alpha$) and ($\beta$) values. The best F1 score was achieved when $\beta=0.5$ and $\alpha=0.9$. The corresponding F1 score is 31.9%, precision score is 73.43% and recall score is 20.4%.

Results for Experiments on Class Imbalance

Semi-supervised learning methods were used to solve class imbalance problem by making use of unlabeled data for training. For both SMOTE and elastic search, we use the ground truth with tag hierarchy and preserve the tag hierarchy in prediction list by using a 'combination of adding parent tags and removing child tags' method with $\alpha=0.5$ and $\beta=0.9$.

SMOTE Semi-Supervised Technique

In SMOTE, synthetic samples are introduced along the line segments joining all of the k minority class nearest neighbors. For experimental data, the number of nearest neighbors to construct synthetic samples used is 5. The targeted minority classes will be over-sampled to achieve an equal number of samples across all classes. With the introduction of synthetic classes, a reduction in false negatives and an increase in false positives are observed. Therefore, recall for SMOTE increased from 11.3% to 30.1% and precision decreased from 71.1% to 40%. The overall F1 score increased from 19.7% to 34.4%.

Figure 11:
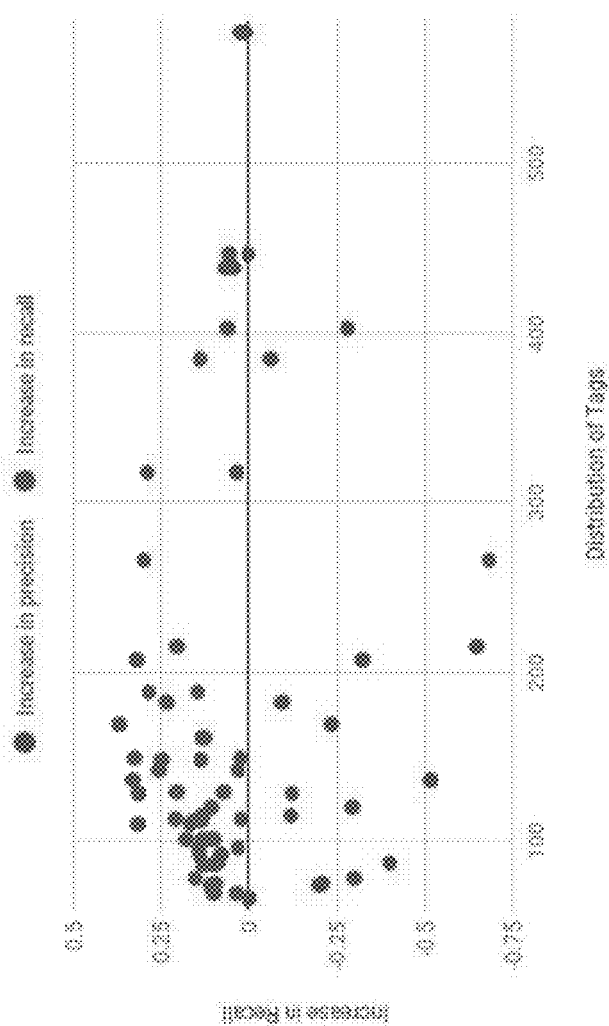
FIG. 11 is a graphical representation of a change in precision and recall scores for each tag vs. frequency of each tag in a training set for a Smote technique, according to aspects of the present disclosure.

As shown in FIG. 11, SMOTE technique was most effective in increasing the recall score for the tags that have frequencies between 95 to 300 in the ground truth. For this range, the average increase in recall for a tag is 23.35%. However, this technique is not very useful for the tags that have a frequency fewer than 95 or for the tags that have a frequency higher than 300. For these ranges, the average increase in recall is just 8.33%. As shown in the Table 5, the percentage of documents with at least one correct prediction increased from 31.37% to 61.76% with SMOTE semi-supervised learning.

Elastic Search Based Semi-Supervised Technique

During experimental testing, the training samples were extended of the each minority class by using document similarity score.

Using the above procedure, the training samples of each of the minority classes is extended to have 500 document titles each. With this approach, precision increases from 71.1% to 78.4%, recall increases from 11.3% to 21.1%, and F1 increases from 19.7% to 33.1%. Compared to SMOTE, precision increases from 40% to 78.4% but there is a dip in recall from 30.1% to 21.1%. When augmenting synthetic samples with the training set using SMOTE technique, it was observed that false negatives decrease and false positives increase with the introduction of synthetic samples. However with Elastic Search-based technique, the false negatives decrease and true positives increase.

Figure 12:
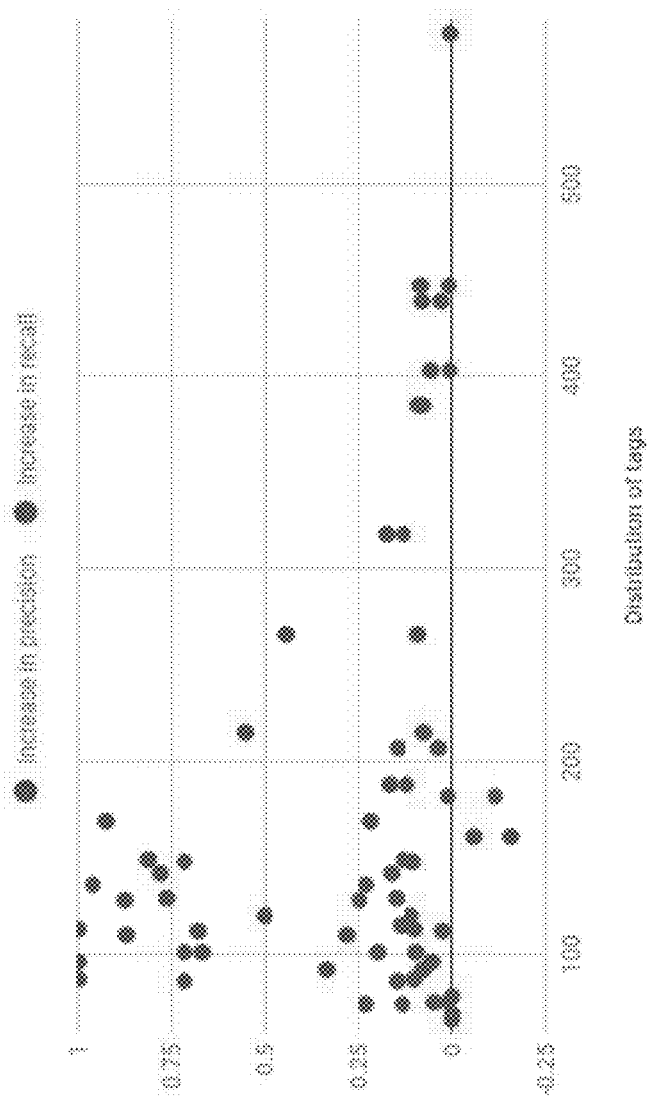
FIG. 12 is a graphical representation of a change in precision and recall scores for each tag vs. frequency of each tag in a training set for Es (elastic search) based on semi-supervised technique, according to aspects of the present disclosure.

As shown in FIG. 12, precision and recall increase for most of the tags. This technique is most effective for the tags that had frequencies between 86 to 318. For this range the average increase in precision is 52% and average increase in recall is 12%. For the tags having frequencies below 86, the increase in precision and recall is just 2.86% and 5.6% respectively. As shown in Table 5, the percentage of documents with at least one correct prediction increases from 31.37% to 54.9% with this approach.

Computer-Implemented System

FIG. 13 illustrates an example of a suitable computing and networking environment (computer system 200) which may be used to implement various aspects of the present disclosure, such as the application 150. Example embodiments described herein may be implemented at least in part in electronic circuitry; in computer hardware executing firmware and/or software instructions; and/or in combinations thereof. Example embodiments also may be implemented using a computer program product (e.g., a computer program tangibly or non-transitorily embodied in a machine-readable medium and including instructions for execution by, or to control the operation of, a data processing apparatus, such as, for example, one or more programmable processors or computers). A computer program may be written in any form of programming language, including compiled or interpreted languages, and may be deployed in any form, including as a stand-alone program or as a subroutine or other unit suitable for use in a computing environment. Also, a computer program can be deployed to be executed on one computer, or to be executed on multiple computers at one site or distributed across multiple sites and interconnected by a communication network.

Certain embodiments are described herein as including one or more modules. Such modules are hardware-implemented, and thus include at least one tangible unit capable of performing certain operations and may be configured or arranged in a certain manner. For example, a hardware-implemented module may comprise dedicated circuitry that is permanently configured (e.g., as a special-purpose processor, such as a field-programmable gate array (FPGA) or an application-specific integrated circuit (ASIC)) to perform certain operations. A hardware-implemented module may also comprise programmable circuitry (e.g., as encompassed within a general-purpose processor or other programmable processor) that is temporarily configured by software or firmware to perform certain operations. In some example embodiments, one or more computer systems (e.g., a stand-alone system, a client and/or server computer system, or a peer-to-peer computer system) or one or more processors may be configured by software (e.g., an application or application portion) as a hardware-implemented module that operates to perform certain operations as described herein.

Accordingly, the term "hardware-implemented module" encompasses a tangible entity, be that an entity that is physically constructed, permanently configured (e.g., hardwired), or temporarily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software, in the form of the application 150 or otherwise, may include a hardware-implemented module and may accordingly configure a processor 202, for example, to constitute a particular hardware-implemented module at one instance of time and to constitute a different hardware-implemented module at a different instance of time.

Hardware-implemented modules may provide information to, and/or receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and may store the output of that operation in a memory device to which it is communicatively coupled. A further hardware-implemented module may then, at a later time, access the memory device to retrieve and process the stored output. Hardware-implemented modules may also initiate communications with input or output devices.

As illustrated, the computing and networking environment 200 may be a general purpose computing device 200, although it is contemplated that the networking environment 200 may include other computing systems, such as personal computers, server computers, hand-held or laptop devices, tablet devices, multiprocessor systems, microprocessor-based systems, set top boxes, programmable consumer electronic devices, network PCs, minicomputers, mainframe computers, digital signal processors, state machines, logic circuitries, distributed computing environments that include any of the above computing systems or devices, and the like.

Components of the general purpose computing device 200 may include various hardware components, such as a processing unit 202, a main memory 204 (e.g., a system memory), and a system bus 201 that couples various system components of the general purpose computing device 200 to the processing unit 202. The system bus 201 may be any of several types of bus structures including a memory bus or memory controller, a peripheral bus, and a local bus using any of a variety of bus architectures. For example, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The general purpose computing device 200 may further include a variety of computer-readable media 207 that includes removable/non-removable media and volatile/nonvolatile media, but excludes transitory propagated signals. Computer-readable media 207 may also include computer storage media and communication media. Computer storage media includes removable/non-removable media and volatile/nonvolatile media implemented in any method or technology for storage of information, such as computer-readable instructions, data structures, program modules or other data, such as RAM, ROM, EPSOM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information/data and which may be accessed by the general purpose computing device 200. Communication media includes computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. For example, communication media may include wired media such as a wired network or direct-wired connection and wireless media such as acoustic, RF, infrared, and/or other wireless media, or some combination thereof. Computer-readable media may be embodied as a computer program product, such as software stored on computer storage media.

The main memory 204 includes computer storage media in the form of volatile/nonvolatile memory such as read only memory (ROM) and random access memory (RAM). A basic input/output system (BIOS), containing the basic routines that help to transfer information between elements within the general purpose computing device 200 (e.g., during start-up) is typically stored in ROM. RAM typically contains data and/or program modules that are immediately accessible to and/or presently being operated on by processing unit 202. For example, in one embodiment, data storage 206 holds an operating system, application programs, and other program modules and program data.

Data storage 206 may also include other removable/non-removable, volatile/nonvolatile computer storage media. For example, data storage 206 may be: a hard disk drive that reads from or writes to non-removable, nonvolatile magnetic media; a magnetic disk drive that reads from or writes to a removable, nonvolatile magnetic disk; and/or an optical disk drive that reads from or writes to a removable, nonvolatile optical disk such as a CD-ROM or other optical media. Other removable/non-removable, volatile/nonvolatile computer storage media may include magnetic tape cassettes, flash memory cards, digital versatile disks, digital video tape, solid state RAM, solid state ROM, and the like. The drives and their associated computer storage media provide storage of computer-readable instructions, data structures, program modules and other data for the general purpose computing device 200.

A user may enter commands and information through a user interface 240 or other input devices 245 such as a tablet, electronic digitizer, a microphone, keyboard, and/or pointing device, commonly referred to as mouse, trackball, or touch pad. Other input devices 245 may include a joystick, game pad, satellite dish, scanner, or the like. Additionally, voice inputs, gesture inputs (e.g., via hands or fingers), or other natural user interfaces may also be used with the appropriate input devices, such as a microphone, camera, tablet, touch pad, glove, or other sensor. These and other input devices 245 are often connected to the processing unit 202 through a user interface 240 that is coupled to the system bus 201, but may be connected by other interface and bus structures, such as a parallel port, game port or a universal serial bus (USB). A monitor 260 or other type of display device is also connected to the system bus 201 via user interface 240, such as a video interface. The monitor 260 may also be integrated with a touch-screen panel or the like.

The general purpose computing device 200 may operate in a networked or cloud-computing environment using logical connections of a network Interface 203 to one or more remote devices, such as a remote computer. The remote computer may be a personal computer, a server, a router, a network PC, a peer device or other common network node, and typically includes many or all of the elements described above relative to the general purpose computing device 200. The logical connection may include one or more local area networks (LAN) and one or more wide area networks (WAN), but may also include other networks. Such networking environments are commonplace in offices, enterprise-wide computer networks, intranets and the Internet.

When used in a networked or cloud-computing environment, the general purpose computing device 200 may be connected to a public and/or private network through the network interface 203. In such embodiments, a modem or other means for establishing communications over the network is connected to the system bus 201 via the network interface 203 or other appropriate mechanism. A wireless networking component including an interface and antenna may be coupled through a suitable device such as an access point or peer computer to a network. In a networked environment, program modules depicted relative to the general purpose computing device 200, or portions thereof, may be stored in the remote memory storage device.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A computer-implemented system for improving classification of criminal activities arising from cyber environments, comprising:
a processor configured to:
access a ground truth dataset generated from deep web forum information, the ground truth dataset defining a predetermined tag hierarchy including predetermined tag labels corresponding topics of the deep web forum information;
access data related to a discussion topic for classification from a deep web forum;
extract a set of features from the data by assigning word vectors or paragraph vectors to the data; and
apply a machine classifier to the set of features to generate a prediction list of tags for classifying the discussion topic, wherein the prediction list includes a prediction probability value for each tag of the plurality of tags; and
add all parent tags associated with a tag of the plurality of tags to the prediction list based on a comparison between the prediction probability value for the tag and a first predetermined threshold value.

2. The computer-implemented system of claim 1, wherein a predetermined tag hierarchy is divided into parent tags and child tags, wherein a topic represented by a child tag is representative of a subset of a topic represented by a parent tag, wherein each child tag corresponds to a particular parent tag, and each tag is assigned a corresponding probability value.

3. The computer-implemented system of claim 1, wherein the processor is configured to remove all child tags of the plurality of tags corresponding to a parent tag from the prediction list of tags where a probability value associated with the child tag is below a second predetermined threshold value.

4. The computer-implemented system of claim 1, wherein the processor is configured to add all parent tags of the plurality of tags corresponding to a child tag if a probability value associated with the parent tag is above the first predetermined threshold value.

5. The computer-implemented system of claim 1, wherein the set of features are extracted using textual feature extraction to identify tags associated with topic titles of the data.

6. The computer-implemented system of claim 1, wherein a set of synthetic data samples are created for addition to the ground truth dataset to address class imbalance by creating a set of synthetic sample points along a line defined between a first minority feature vector and a second feature vector and adding the set of synthetic sample points to the ground truth dataset.

7. The computer-implemented system of claim 1, wherein the ground truth dataset is supplemented by, for every sample of the ground truth dataset in a minority class, adding top similar documents from the deep web forum information, as identified using an elastic search similarity score, and adding them to the ground truth dataset.

8. The computer-implemented system of claim 1, wherein the data is parsed and segmented into tokens, and predetermined characters and predetermined common words are removed from the data.

9. The computer-implemented system of claim 1, wherein words within the data are reduced to their root form using stemming and lemmatization procedures.

10. The computer-implemented system of claim 1, wherein the set of features are extracted from the data using a neural network, wherein the neural network is configured to learn a continuous distributed vector representation for documents and words within the data.

11. The computer-implemented system of claim 1, further comprising:
a crawler in operable communication with the processor and operable to traverse a plurality of deep web websites to retrieve Internet documents forming at least a portion of the deep web forum information.

12. A method, comprising:
configuring a processor for executing operations including:
- accessing data associated with a deep web forum, the data defining a topic for classification;
- extracting a set of features from the data as inputs for a machine classifier; and
- apply a machine classifier to the set of features to generate a prediction list of tags for classifying the topic, wherein the prediction list includes a prediction probability value for each tag of the plurality of tags; and
- adding all parent tags associated with a tag of the plurality of tags to the prediction list based on a comparison between the prediction probability value for the tag and a first predetermined threshold value.

13. The method of claim 12, further comprising:
outputting an update to the prediction list of tags, a total number of the tags of the prediction list of tags being different from the update to the prediction list of tags to maintain a predetermined tag hierarchy.

14. The method of claim 12, further comprising generating a predetermined tag hierarchy based on a ground truth dataset, and leveraging semi-supervised learning to address class imbalance and increase accuracy of the machine classifier.

* * * * *